Sept. 14, 1965   F. W. BENTLEY   3,206,121
RADIANT PANEL HEATED CHICKEN BROODER
Filed June 4, 1963   4 Sheets-Sheet 1
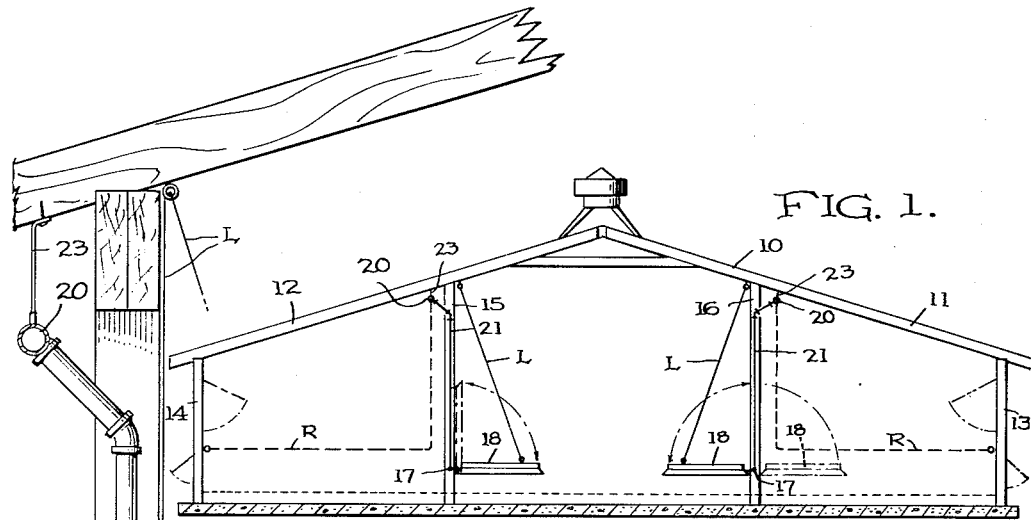
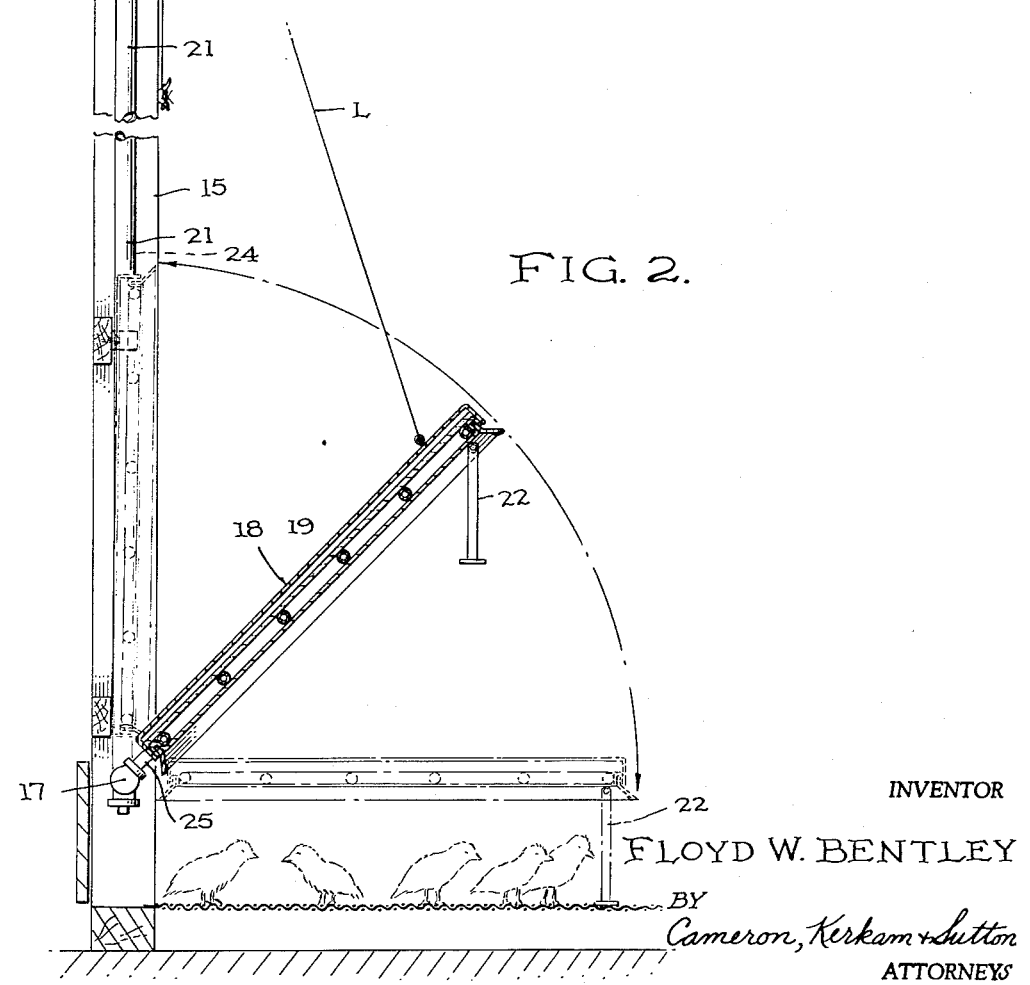
INVENTOR
FLOYD W. BENTLEY
BY
Cameron, Kerkam & Sutton
ATTORNEYS Sept. 14, 1965   F. W. BENTLEY   3,206,121
RADIANT PANEL HEATED CHICKEN BROODER
Filed June 4, 1963   4 Sheets-Sheet 2
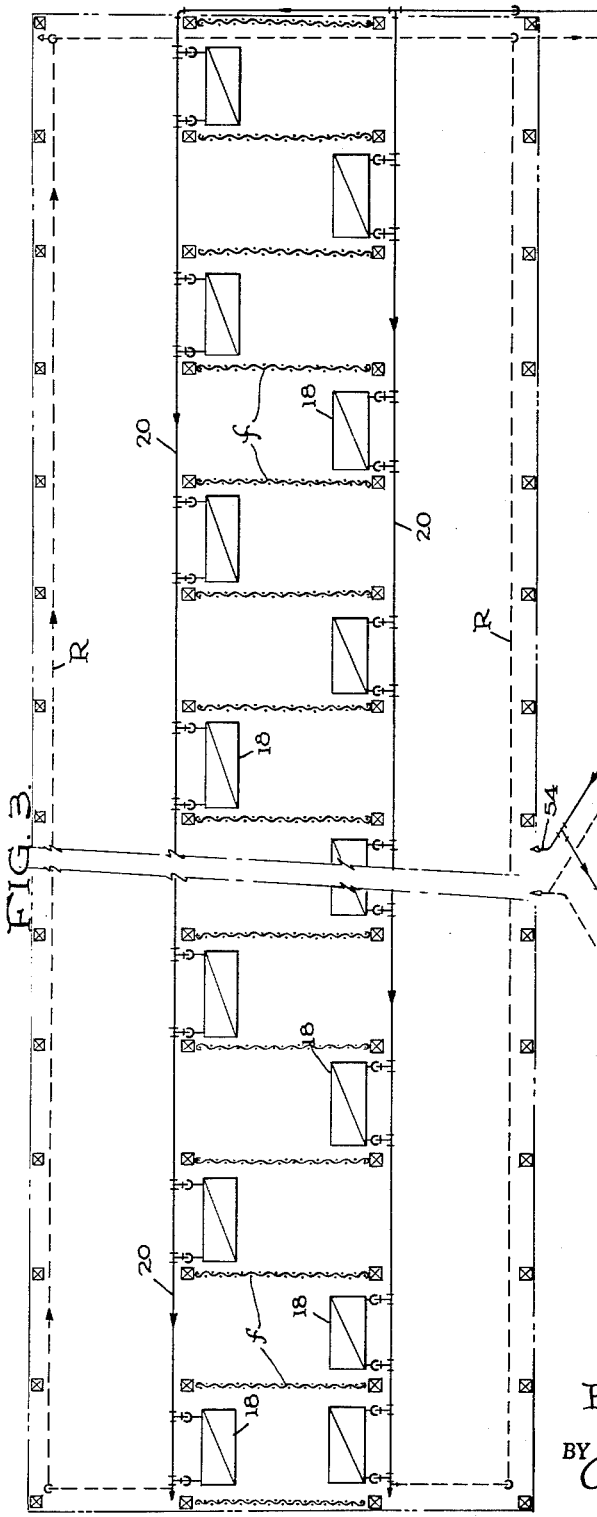
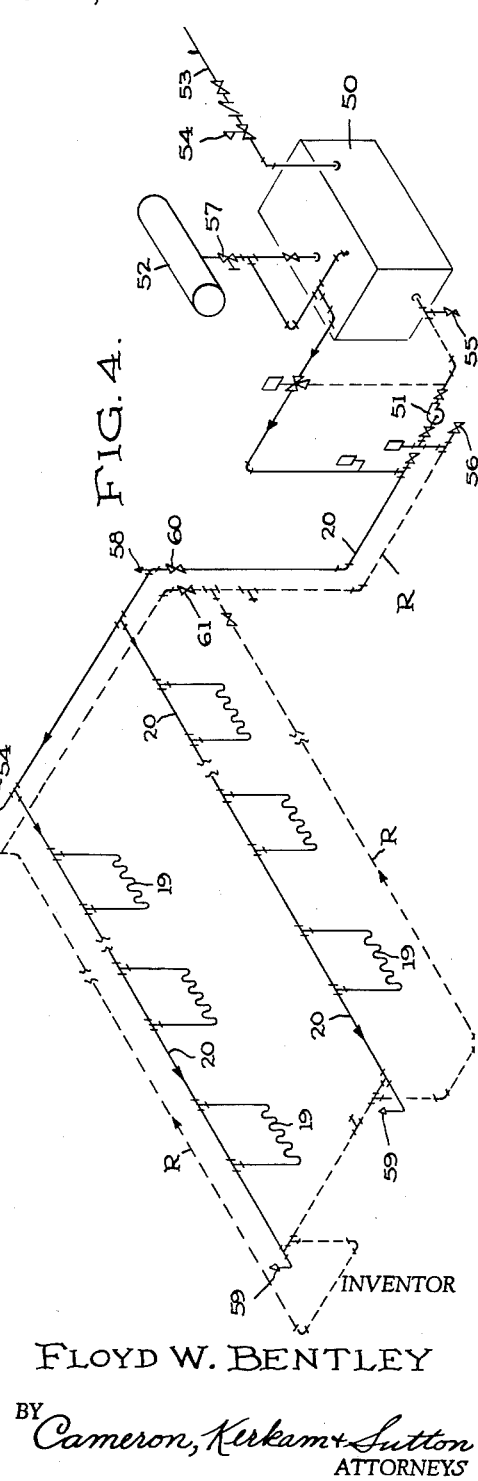
INVENTOR
FLOYD W. BENTLEY
BY Cameron, Kerkam + Sutton
ATTORNEYS Sept. 14, 1965 F. W. BENTLEY 3,206,121
RADIANT PANEL HEATED CHICKEN BROODER
Filed June 4, 1963 4 Sheets-Sheet 3
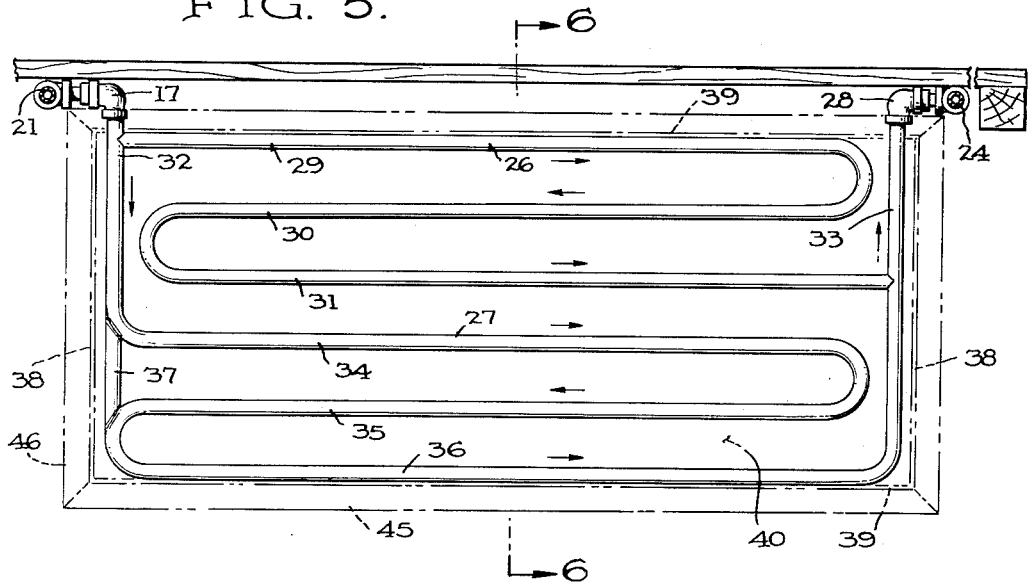
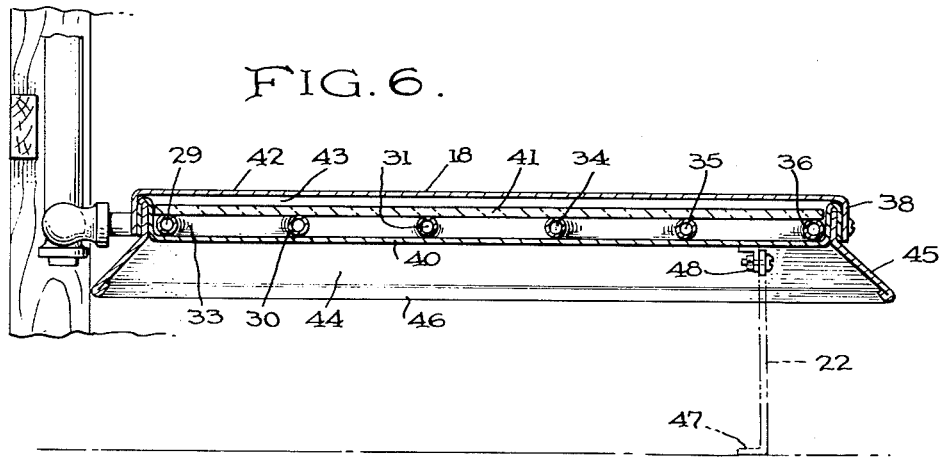
INVENTOR
FLOYD W. BENTLEY
BY Cameron, Kerkam & Sutton
ATTORNEYS

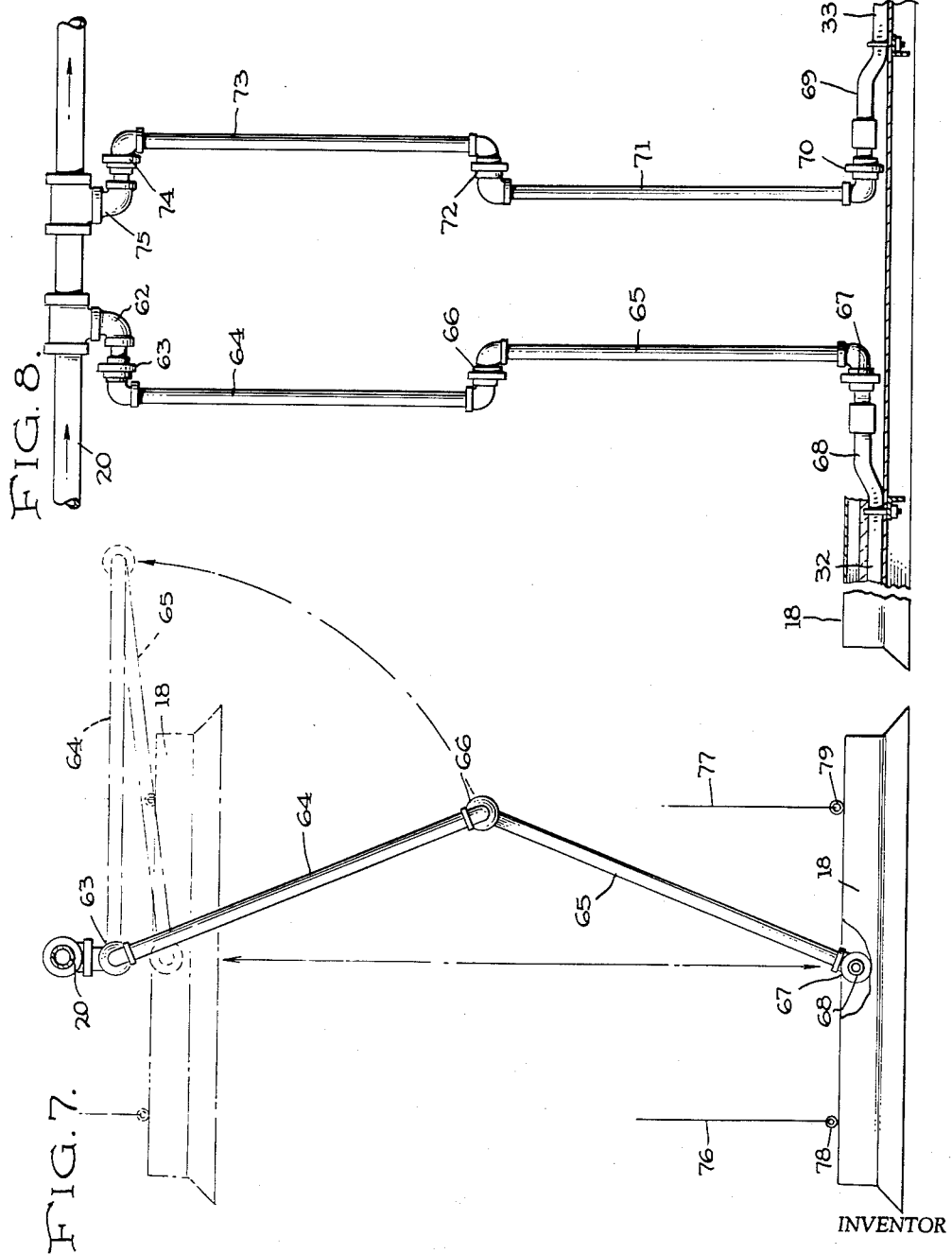

United States Patent Office 3,206,121
Patented Sept. 14, 1965

3,206,121
RADIANT PANEL HEATED CHICKEN BROODER
Floyd W. Bentley, 1319 Woodland Road,
Salisbury, Md.
Filed June 4, 1963, Ser. No. 285,478
4 Claims. (Cl. 237—15)

This invention relates to an improved chicken brooder, and an improved heating system therefor including novel radiant heat panels the coils of which are heated by hot water from a central boiler plant which is circulated therethrough from a main piping system. The individual heat coils and radiating plate in each radiant panel are designed most effectively to utilize and radiate the heat from the circulated water. The coils are so designed as to reduce back pressure in the coil system and implement flow therethrough.

In the past, large chicken brooder establishments have been plagued with many problems, the most troublesome of which has been the proper regulation of the heat in each individual brooder or "hover" for the small chicks wherein carefully controlled temperatures are essential for the maintenance of proper growing conditions. In the past, it has been usual to heat each "hover" individually, as by way of an individual gas heater disposed under the hover cover. This system has raised many problems. In the gas heated hover, the combustion of the gas creates noxious fumes which have had a most deleterious effect upon the chicks. Further, gas combustion heaters of this type creates moisture which wets the "litter" on the floor of the brooder, causing disease and loss of chicks. The heat produced by such heaters fluctuates widely and is not uniform and this type of heat is expensive and inefficient.

In chicken brooders, as they are presently established, it is usual to house as many as 50 individual "hovers" for the baby chicks under one roof in an elongate building, each hover housing about 800 one-day old chicks at the incept of the brooding cycle. The normal period of brooding in such houses is approximately ten weeks, during which period the one-day old chicks progressively develop through various stages of growth until they attain the age of 10 weeks and a weight of approximately 4 pounds, at which time they are ready for the market as "broilers."

As the chicks develop, they require progressively more room in the "hover" area and progressively less heat in the "hover" area, optimum initial heat for one day old chicks being approximately 95°–97° F. ambient temperature and ultimate terminal heat in the hover for ten-week old "broilers" being approximately 75°–80° F. ambient temperature. Too low an ambient temperature in the "hover," i.e. below 65° F., results in crowding of the chicks to maintain body temperature, and in an excessive food consumption to maintain temperature. Crowding also results in malformed breasts and in improperly developed and unsaleable grown chickens at the end of the cycle. Dampness in the "litter" on the floor of the "brooder" causes sickness and also the formation of calcium deposits in the breasts, which reduce the value of the chickens.

The present invention contemplates the use of "radiant heat" in each hover, the temperature of the water through the circulating coil in each radiant heat panel being carefully controlled to maintain optimum temperature in the "hover" at all times during each stage of development of the chicks.

The invention contemplates further the provision of an efficient, oil- or gas-heated central boiler plant from which circulating water, initially heated up to approximately 200° F., is pumped out through the main piping system and through the individual dual coil systems in each radiant heat panel, the circulating water being then circulated back to the central boiler system for reheating and recirculation.

Utilizing this radiant heat panel system, mortality and sickness among the baby chicks have been reduced to the minimum, feed consumption has been drastically reduced by as much as 15% during the feeding cycle of 10 weeks and the broilers produced are of prime and optimum quality and of uniform weight, approximating 4 pounds each. Further, due to the elimination of moisture and crowding in the "hovers," the chickens during their development are maintained in prime condition.

It is therefore a primary object of this invention to provide an improved brooding installation in which carefully controlled radiant heat is uniformly provided for each "hover" in the brooding house and in which sickness and malformation of the chickens is eliminated.

It is a further object of this invention to produce such a brooding system in which feed requirements are maintained at a minimum, while growth results are at a maximum.

It is a further object of this invention to produce such a brooder installation in which five broods may be produced each year, as opposed to the conventional four broods normally produced in such installations.

It is a further object of this invention to produce an improved radiant heat panel for brooder installations which assures proper heating of each hover and which positively eliminates crowding and underheating therein.

Another object of this invention is to keep heating costs during the brooding period at an absolute minimum and to positively insure an efficient and effective brooding cycle wherein sickness and mortality are drastically reduced.

It is contemplated that with the present hot water circulating heating system through radiant heat panels that an improved broiler will be produced and that all expenses incident to the brooding period will be materially reduced.

A brooding house may be of some 300' in length, by 50' in width, although these dimensions may be varied, depending upon the size of installation desired and the number of chicks to be processed. An installation of these dimensions will accommodate some 60 "hovers," each housing 800 one-day old chicks and capable of producing upwards of 48,000 four-pound broilers in a ten-week brooding cycle. It will be noted that the "hovers" and heat panels extend the length of each inner wall of the elongate house and are disposed in staggered position, thus increasing the effective "hover" area for each brood of 800 chicks, as will hereinafter be discussed in more detail.

Referring to the drawings, FIG. 1 is an end view of an "A" frame type brooding house, incorporating the radiant heat panels and hot water circulating system of the present invention;

FIG. 2 is a detailed side view, partially in cross section and in phantom, of a pivotally mounted radiant heat panel made in conformity with the present invention and showing the hot water supply line and coil for the panel;

FIG. 3 is a schematic top plan view of the panel arrangement and supply lines for the A frame type building of FIG. 1;

FIG. 4 is a schematic plan view of the boiler and circulating system for the hot water, showing the circulation through the individual radiant heat panels and the return lines for the hot water;

FIG. 5 is a top plan view of the radiant heat coils positioned in the upper, rectangular section of the radiant heat panel over the radiating plate, partially in phantom, and showing the ball joints at the inlet and outlet ends of the coil and panel structure which provide a pivotal mounting for the radiant heat panel at its inner, lateral extremities;

FIG. 6 is a cross sectional view of the radiant heat panel structure, taken on line 6—6 of FIG. 5, showing the panel structure in detail;

FIG. 7 is a side view, partially in phantom, of an alternative embodiment of a mounting or support for the radiant heat panel of the present invention, showing the panel in fully lowered and fully raised position above the "hover" area; and FIG. 8 is an end view of this embodiment of the invention, partially in section, showing the radiant heat panel and its supporting, pivoted pipe structure in fully lowered position over the "hover" area.

Referring specifically to FIGS. 1 and 3, 10 designates the brooder house structure broadly, the brooder house being of the "A" frame type of construction, of any desired length and preferably of a width of approximately 50'. The length of brooder house 10 depends entirely upon the number of "hovers" it is designed to accommodate and varies widely, up to an extreme length of 600', which type of installation will accommodate some 120 "hovers" and a brood of some 96,000 chicks, as will hereinafter be more fully discussed.

Brooder house 10 comprises broadly angular roof sections 11 and 12 supported at their lateral extremities by lateral walls 13 and 14 and provided with interior vertical walls 15 and 16 which, as shown, define the longitudinally, centrally disposed rows of "hovers," as will hereinafter be more fully discussed.

Pivotally mounted at the lower, inner extremities of walls 15 and 16, as by means of Barco ball joints or analogous pivotal pipe joints 17 and 28 are radiant heat panels 18, the internal coils 19 of which are supplied with hot water from hot water main 20 by means of delivery pipes 21 for each hover area, as will hereinafter be discussed in detail.

As shown in FIGS. 1, 2 and 6, radiant heat panels 18 are initially supported in lowered position, parallel to the floor of the brooder house by means of pivoted leg members 22 at a distance of preferably 12 inches above the floor thereof. Lines L are provided to adjust the angular position of panels 18. Lines L, as shown, are affixed to appropriate rings at the upper centers of panels 18 and extend upwardly therefrom to appropriate brackets disposed adjacent the upper extremities of walls 15 and 16, through which they may be shortened, as required. Line L may be provided with a series of stops or hooks to define the angular position of panels 18 for each cycle of the brooding period.

As shown in FIG. 3, radiant heat panels 18 are preferably alternately positioned, or "staggered" on opposite walls 15 and 16 of the house 10 to provide progressively enlarging brooding areas for the chicks as they increase in size and progressively require more "hover" area. This "staggered" arrangement of radiant heat panels 18 along the opposite walls 15 and 16 of the brooder house also prevents overheating of the "hover" areas and provides an equality of heat throughout each "hover" area, regardless of the position of the radiant heat panels 18. Each "hover" or brood area is from 10–12' in width by 25–32' in length and is defined by removable lateral barriers of chicken wire f, 2' in height, extending the width of the brooder house, which separate each brood area.

As shown in FIGS. 1 and 2, hot water main 20 is preferably suspended beneath the ceiling of the house 10 by means of a series of hangers or brackets 23 and extends longitudinally outwardly of the upper extremities of walls 15 and 16 the length of the house to provide hot water of the desired temperature to each of the coil systems 19 of each of the radiant heat panels 18, as will hereinafter be discussed in more detail.

Extending downwardly from hot water main 20 are delivery pipes 21 and return pipes 24 which return circulated hot water from the coil 19 of the radiant panel back to the hot water main 20.

As shown in FIGS. 2, 5 and 6, a pivotal, water circulating ball point 17, such as a Barco ball joint, is provided at the foot of each of the vertical inlet lines 21 for supplying hot water to the inlet extremity of lateral pipe 32 through which hot circulating water is directed to sections 26 and 27 of the circulating coil structure positioned within the upper extremity of radiant heat panel 18. At the exit or outlet end of the radiant heat coil system another Barco ball joint 28 is provided communicating with vertical outlet duct 24 through which hot circulating water returns to the circulating hot water main 20. A 1 x 2" "monoflow" fitting M is preferably provided in main 20 where outlet duct 24 joins main 20, to provide a "pull" or venturi action at this point to assist in returning the hot water from coil 19 into main 20.

Hot water main 20 is preferably formed of 2" steel pipe, appropriately insulated, and the internal radiant heat coil 19 of radiant heat panel 18 is preferably formed of 1" steel pipe.

As shown in FIG. 5, the radiant heat coil system for each radiant heat panel 18 is preferably divided into two sections, 26 and 27, to divide pressure therein in half and to reduce back pressure in the coil system in each radiant heat panel 18. Thus, it will be seen that coil section 26 is composed of three parallel reaches 29, 30 and 31, the initial end of first reach 29 communicating with and being welded to lateral feed line 32 extending inwardly from Barco ball joint 17, the feed through section 26 being shown by arrows through reach 29, back through reach 30 and then back through reach 31 thereof to outlet line 33 and thence to ball joint 28 and upwardly through vertical outlet pipe 24, through monoflow fitting M to hot water main 20.

Referring to second section 27 of the radiant heat coil system of panel 18, it will be noted that section 27 comprises reaches 34, 35 and 36 which are parallel to each other and which are returned upon each other, the flow through which is designated by arrows. A short weld section 37 is provided between the extremities of reaches 34 and 35 to maintain them in proper relative position and to maintain the parallelism of the coil sections and the unity of the entire coil structure. It will be seen further that flow through reach 36 of coil section 27 is directly out to lateral pipe 33, thence through ball point 28 and out through outlet pipe 24.

By providing two separate sections 26 and 27 in the hot water coil in each radiant heat panel 18 pressure in the said hot water coil in each radiant heat panel is reduced by half and an equalized and uninterrupted flow of hot water through the panel coil system is assured without the creation of back pressures which could impede proper and uniform flow of hot water therethrough.

The provision of ball joints 17 and 28 at the inlet and outlet extremities of the panel coil system, respectively, provides the necessary pivotal mounting at each lateral, inner extremity of each radiant heat panel 18 whereby the upward angular inclination of each radiant heat panel may be progressively adjusted proportionately to the growth of the chicks in each hover area defined by each radiant heat panel and heated thereby, as will hereinafter be discussed at more length.

Referring now specifically to the structure of each of the radiant heat panels 18, as shown in FIGS. 2, 5 and 6, it will be seen that each panel is in the form overall of an elongate rectangle, on the order of 48 inches in width by 96 inches in length. The upper section of each panel is in the form of an elongate, rectangular box-like structure composed of vertical side walls 38, end walls 39 and bottom plate 40. It will be seen from FIG. 5 that side walls 38 are on the order of one-half of the length of end walls 39. At their inner extremities end walls 39 are appropriately bored for passage of lateral pipes 32 and 33 of the coil system as they extend inwardly, respectively from ball joints 17 and 28. The lower plate 40 of the upper, box-like section of radiant heat panel 18 is preferably a galvanized steel sheet of 26 gauge against which the heat coil 19 impinges and to which coil 19 is appropriately welded or otherwise affixed in close, bearing relationship. Disposed over coil 19 within the upper box structure of panel 18 is a layer of insulation 41, preferably formed of fiberglass, rigid urethane foam or other analogous insulating material and preferably on the order of 1″ in thickness. The urethane foam is preferred, as fiberglass will absorb moisture and thus will lose its insulating properties.

A rectangular cover 42, also preferably formed of galvanized steel, is closely fitted downwardly over side walls 38 and end walls 39 of the box-like upper structure of heat panel 18 and is appropriately bolted or otherwise affixed over walls 38 and 39 thereof. The dimensions of cover 42 are preferably sufficiently larger than those of box structure 38–39 so that cover 42 will make a close downward fit thereover. An airspace 43 is preferably provided between the upper surface of insulating layer 41 and the inner surface of cover 42 to further improve the insulating properties thereof.

The lower portion of radiant heat panel 18 is preferably in the form of an outwardly angled skirt or flange section 44, the side portions 46 and end portions 45 thereof being downwardly and outwardly inclined from side walls 38 and end walls 39 of the upper box structure, at an angle of approximately 45°.

As shown, side walls 46 and end walls 45 of depending flange 44 are preferably made integral with side walls 38 and end walls 39, respectively, of the upper box structure of the panel. As shown, a pivoted supporting leg 22, provided with a foot portion 47, is preferably pivotally mounted in bracket 48 disposed centrally of the outer extremity of bottom plate 40 of box structure 38–39. Pivoted leg structure 22 is designed to maintain radiant heat panel 18 in its fully lowered position, parallel to the floor of the brooder house at a distance of approximately 12″ thereabove during the early portion of the ten weeks brooding period, when the chicks are very young, i.e., from 1 day to 10 days old, during which period they require the maximum of heat (97° F.) and a minimum of space, due to their extremely small size.

It will thus be seen that radiant heat panel 18 comprises overall an upper, box-like housing composed of side walls 38 and end walls 39 vertically disposed with respect to a bottom plate 40 and providing a housing for hot water circulating coil 19, the lateral pipes 32 and 33 of which are appropriately led through recesses at the lateral, inner extremities of vertical end wall 39.

Integral with side walls 38 and end walls 39 of the upper box-like structure of the radiant heat panel and extending downwardly and outwardly therefrom at an angle of 45° are side flanges 46 and end flanges 45, depending downwardly therefrom. As aforesaid, coil 19 is disposed within box structure 38–39 against plate 40 and is insulated therein by means of insulating layer 41 and airspace 43, rectangular cover 42 being applied downwardly over box structure 38–39 to provide a cover therefor. Due to the provision of swivel joints 17 and 28 at the inlet and outlet extremities of the radiant heat coil 19 a pivotal mounting for the radiant heat panel 18 is provided at the lower extremities of hot water inlet pipe 21 and outlet pipe 24, respectively. Thus, the angular attitude of radiant heat panel 18 with respect to the floor of the brooder house may be adjusted through control line L, as required, without interruption of flow of heating water through the coil system of the radiant heat panel.

Lower plate 40 of radiant heat panel 18 is preferably formed of galvanized steel of 26 gauge and acts as a radiating surface from which heat radiates downwardly over the "hover" area. As aforesaid, coil 19, of 1″ steel pipe, composed of coil sections 26 and 27 and inlet and outlet sections 32 and 33, bears directly against the upper surface of plate 40. Coil 19 is initially supplied with hot water of about 200° F., from main 20 and is heated thereby to approximately that temperature, i.e., 200° F., during the early stage of the brooding period. As insulating layer 41 and air space 43 are provided under cover 42, over coil 19, substantially all of this heat is directly transferred from coil 19 to plate 40, heating plate 40 to an analogous temperature of slightly less than 200° F. As plate 40 is formed of galvanized steel it readily radiates heat, the area of radiation therefrom being defined by depending, angular flanges 45 and 46 of the lower section of panel 18. This radiant heat as it radiates from the lower surface of plate 40 is on the order of 97° F., during the early stage of the brooding cycle. With panel 18 in fully "lowered" position, 12″ above the floor of the "hover," the "hover" area is uniformly heated by radiation from plate 40 to about 97° F. This position of panel 18 and this hover temperature (97° F.) is maintained during the first week or so of the brooding period, while the chicks are very small. As the chicks grow, panel 18 is progressively raised angularly with respect to the floor of the hover, in stages, by means of line L, thus increasing proportionately the area of radiation from plate 40 and the area heated thereby and proportionately and progressively reducing the heat radiated to the enlarged "hover" area. Thus, in the second stage, panel 18 may be raised 10° above the horizontal, in the third stage it may be raised an additional 10–15°, and so forth, until at the end of the ten weeks' brooding period panel 18 may be at 90° to the floor, thus radiating a reduced amount of heat to the entire "hover" area. The temperature of the air in the "hover" area at this final stage of the brooding period will be between 75° F. and 80° F. At this stage of the brooding period the "hover" area has been enlarged from its original 48″ x 96″ to an area of about 120″ x 300″, to accommodate the eight hundred nearly 4 lb. broilers in the area.

Further, as the brooding period progresses, the temperature of the circulating water delivered from the boiler to main 20 is progressively reduced, from an initial temperature of about 200° F. to a terminal temperature of about 140° F., at the end of the 10 weeks' cycle.

Due to the angular flanges 45 and 46 extending outwardly beneath plate 40, radiating plate 40 throws a progressively enlarged "pyramid" of radiant heat over an ever-increasing area, as panel 18 is progressively raised, pivoting on swivel joints 17 and 28 at its rear, lateral extremities. In its fully raised, 90° position, this radiant heat "pyramid" is at its largest and the entire "hover" area is thus "flooded" with radiations from plate 40, the heat in the "hover" area being thus proportionately reduced to a uniform overall heat of 75–80° F., the optimum temperature for nearly mature broilers.

It will be understood that during the hot summer months, the requirements of heat from boiler 50 through the panel coil systems will be greatly reduced. Thus, depending upon the outside and inside temperatures, the temperature of the circulating water from boiler 50 will be appropriately reduced and modified to maintain proper "hover" temperatures at all times. It may be completely cut off by closing valve 60, during hot, summer days, when the hover temperature is adequate without added heat.

The same operation is true for the embodiment of the invention shown in FIGS. 7 and 8, the panel 18, in this embodiment, however, being raised vertically, progressively, rather than having its angle of inclinations to the floor of the "hover" increased. In this embodiment, as the panel 18 is progressively raised, the "hover" area is proportionately increased and the "hover" temperature proportionately decreased, down to a minimum of 75° F., as the chicks grow larger and require less heat and more "hover" space.

Referring now to FIG. 4 of the drawings, the boiler and hot water circulating system for the radiant heat panels is schematically illustrated in this figure. Boiler 50 is shown, preferably oil or gas fired, and of a capacity of at least 600,000 B.t.u./hour output and is so designed as to deliver 60 gallons of water per minute at a maximum temperature of 200° F. through the system. Circulating pump 51 is designed to deliver 30 g.p.m. at a 12 foot head, to the system. Expansion tank 52 is preferably of a 40 gallon capacity. This showing is schematic and, as aforesaid, the hot water main 20 is preferably 2 inches in diameter, the radiant heat coils 19 of the radiant heat panels 18 being preferably one inch in diameter.

The cold water makeup line leads into boiler 50 through pressure regulating valve 54 and appropriate drain valves 55 and 56 are provided in the system. Air charger drainer 57 is provided between boiler 50 and expansion tank 52.

Air vents 59 are provided at the ends of the system.

Gate valves 60 and 61, 1¼ inches, are provided in the system and are regulated depending upon the heat requirements of the system and the outside temperature. Thermometers are provided, registering the water temperatures, respectively, in the main 20 and return line R.

The return lines R for each side of the system are shown in dotted lines.

The showing in FIG. 4 is schematic and may be modified, or added to, as required, to include as many radiant heat panel units as desired.

Referring now to FIGS. 7 and 8 of the drawings, these figures illustrate an alternative embodiment of the radiant heat panel in which an alternative mounting therefor is provided by means of which the panel is not angularly adjusted with respect to the floor but is progressively vertically raised with respect thereto as the chickens increase in size, to equalize heating in the hover area and to make available additional required space for the growing chickens.

In this embodiment of the invention the radiant heat panel structure per se is identical to that shown in FIGS. 2, 5 and 6, the mounting system therefor alone being changed. Thus, in this embodiment of the invention, the hot water main 20 itself acts as the support for the system. Main 20 is provided with gooseneck fitting 62 leading to swivel joint 63 and support section 64, on the inlet side of the system. Section 64 is connected to lower section 65 by swivel joint 66. At the lower extremity of lower section 65 on the inlet side there is provided a swivel joint 67 from which pipe section 68 leads directly into the inlet end of lateral pipe 32 of the radiant heat coil system. At the opposite, or outlet, side of the system outlet pipe 33 of the coil system 26–27 leads by way of pipe section 69 into swivel joint 70 then through outlet pipe section 71 through swivel joint 72, upper outlet pipe section 73, pivoted joint 74 and back to hot water main 20 through "monoflow" fitting 75 which acts as a venturi to "pull" the heating water through the outlet system into main 20. It will thus be seen that by means of the pivotal connections 63, 66 and 67 in the inlet line and pivotal connections 70, 72 and 74 in the outlet line that the retaining pipe sections 64–65 and 73–71 may fold upon each other, as shown in FIG. 7, whereby the radiant heat panel 18 so supported may be progressively raised higher above the brooder floor without interruption to the flow of hot water through the pipe systems and through the radiant heat coil 19 of panel 18.

As shown, appropriate elevating lines 76 and 77 are provided affixed to rings 78 and 79 on the upper surface of panel 18 to elevate the panel as required.

As aforesaid, when the one day old chicks are first placed within the hover area, under radiant heat panels 18, they require the maximum of heat and the minimum of space and at this time the panels are maintained through lines 76 and 77 in extreme lowered position, approximately 12 inches above the floor of the house. As the chicks develop and increase in size and weight progressively less heat is required and a proportionately larger hover area is required. Thus, week by week the radiant heat panels are raised progressively farther above the floor of the brooder house and the heat of the hover area is progressively reduced, while being maintained at optimum level, as the hover area is increased.

The normal brooding period for one day old chicks to four pound broilers is on the average of 10 weeks and at the end of this period when the chicks are fully grown the heat panels 18 will be in fully raised position, as shown in FIG. 7 and the effective temperature of the hover area will have been reduced from approximately 97° F. to approximately 75–80° F. the radiant heat however being uniform and of uninterrupted flow. As aforesaid, the temperature of the circulating water is also progressively reduced from 200° F. to 140° F.

Referring back to the embodiment of the invention shown in FIGS. 1, 2, 5 and 6 it will be seen that in this embodiment of the invention, the radiant heat panels initiate in parallel position to the floor at an elevation of some 12 inches, some 800 one-day old chicks being housed therebeneath in a hover area of approximately 48″ x 96″. As the chicks grow and require progressively more space and proportionately less heat the panel is progressively angularly raised by means of adjustment line L to provide progressively more hover area space and progressively less heat in the hover area. At the end of the ten weeks' brooding period, when the chicks have attained a weight of approximately 4 pounds and are ready for market, the heat panels 18 will have been raised to substantially a vertical position with respect to the side walls 15 and 16 of the brooder house.

It will be appreciated that if at any time the temperature in a "hover" area becomes too high, the heat panel may be raised to reduce the temperature to the proper level. Conversely, if the temperature in an area becomes too low the panel 18 may be appropriately lowered to bring the temperature to the proper level.

In the hot summer months, when the ambient temperature within the "hovers" is at the proper level, without the use of radiant heat from the panels, the flow of hot water through the main 20 may be cut off entirely, by closing main valve 60.

As shown in FIG. 1, the radiant heat panels may be disposed at the opposite side of walls 15 and 16, in certain installations, leaving the entire center alley or lane of the building free for service trucks and maintenance.

The invention is susceptible of numerous embodiments without departing from the spirit thereof. The primary and basic concept involved here is that of providing radiant heat panels heated by novel and improved two-part coil and plate systems, the heat for the coil systems in the radiant heat panels being provided from a central hot water boiler and being maintained uniform throughout the system.

Numerous alternative embodiments of the invention may be evolved without departing from the spirit thereof.

Attention is directed to the appended claims for a limitation of the scope of this invention.

What is claimed is:

1. In a radiant heat panel for brooders, a rectangular top section provided with vertical side and end walls and a steel bottom plate, a hot water coil system divided into two separate and integral sections bearing closely against and affixed to said bottom plate, outwardly angled, depending side and end walls made integral with the side and end walls of said top section and depending outwardly therefrom, a layer of insulation in said top section over said coil system, a cover fitted downwardly over said top section and spaced from said insulation, inlet and outlet pipes for said coil system, a hot water main communicating with said inlet and outlet pipes, and ball joints between said inlet and outlet pipes and said coil system whereby said panel may be angularly adjusted with respect to the horizontal to progressively increase brooder space and reduce temperature as the panel is angularly raised.

2. In a brooder system, an elongate brooder house, vertical, parallel internal walls extending the length of the house, a series of radiant heat panels pivotally mounted along the lower, inner extremities of said walls, in staggered relation, and extending inwardly therefrom, coils disposed within said radiant heat panels, a source of hot water communicating with said coils, and means within said house for varying the angular inclination of said panels with respect to the floor of said house whereby the extent and temperature of the area defined by each of said panels may be varied, as required.

3. In a brooder system, an elongate brooder house, vertical, parallel internal walls extending the length of the house, a series of radiant heat panels pivotally mounted along the lower, inner extremities of said walls, in opposite, alternate position, and extending inwardly therefrom, coils disposed within said radiant heat panels, a source of hot water communicating with said coils, and means within said house for varying the angular inclination of said panels with respect to the floor of said house whereby the extent and temperature of the area defined by each of said panels may be varied, as required.

4. In a radiant heat panel for brooders, a rectangular top section provided with vertical side and end walls and a bottom plate, a hot water coil system divided into two separate and parallel three reach sections extending substantially the full width of the top section bearing closely against said bottom plate, outwardly angled, depending side and end walls made integral with the side and end walls of said top section and depending outwardly therefrom, a layer of moisture impervious insulation in said top section over said coil system, a cover fitted downwardly over said top section, inlet and outlet pipes for said coil system extending outwardly at right angles from the inlet and outlet ends thereof, respectively, through the opposite lateral extremities of the outer end wall of said top section, a hot water main communicating with said inlet and outlet pipes, and ball joints between the extremities of said inlet and outlet pipes and said hot water main whereby said panel is pivotal thereon at its outer extremity and may be angularly adjusted upwardly thereon with respect to the horizontal to progressively increase brooder space and reduce temperature in the brooder space as the panel is angularly raised.

References Cited by the Examiner

UNITED STATES PATENTS

| | | | |
|---|---|---|---|
| 1,592,377 | 7/26 | Martin | 237—15 X |
| 1,927,991 | 9/33 | Pendleton | 165—77 X |
| 2,436,389 | 2/48 | Kleist | 165—171 X |
| 2,749,106 | 6/56 | Ness | 163—40 X |
| 2,806,360 | 9/57 | Armentrout | 165—171 X |

FOREIGN PATENTS

| | | |
|---|---|---|
| 639,898 | 3/28 | France. |
| 835,513 | 3/52 | Germany. |
| 171,492 | 11/21 | Great Britain. |

EDWARD J. MICHAEL, *Primary Examiner.*